United States Patent
Andreoli-Fang et al.

(10) Patent No.: US 9,749,933 B2
(45) Date of Patent: Aug. 29, 2017

(54) DYNAMIC NETWORK SELECTION

(75) Inventors: Jennifer Andreoli-Fang, Boulder, CO (US); Bernard McKibben, Broomfield, CO (US); Vikas Sarawat, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 916 days.

(21) Appl. No.: 13/537,272

(22) Filed: Jun. 29, 2012

(65) Prior Publication Data

US 2014/0003254 A1   Jan. 2, 2014

(51) Int. Cl.
H04W 48/12    (2009.01)
H04W 48/18    (2009.01)
H04W 48/20    (2009.01)
H04W 28/02    (2009.01)

(52) U.S. Cl.
CPC ........... *H04W 48/12* (2013.01); *H04W 28/02* (2013.01); *H04W 48/20* (2013.01); *H04W 48/18* (2013.01)

(58) Field of Classification Search
None
See application file for complete search history.

(56) References Cited

U.S. PATENT DOCUMENTS

| | | | |
|---|---|---|---|
| 2002/0039892 A1* | 4/2002 | Lindell | 455/151.1 |
| 2004/0213255 A1* | 10/2004 | Brinkerhoff | H04L 12/5693 370/395.1 |
| 2008/0221918 A1* | 9/2008 | Petersen | G06Q 50/22 705/2 |
| 2008/0311912 A1* | 12/2008 | Balasubramanian et al. | 455/436 |
| 2009/0003278 A1* | 1/2009 | Abdel-Kader | H04W 48/18 370/331 |
| 2009/0034428 A1* | 2/2009 | Jeong | H04L 47/10 370/252 |
| 2009/0175250 A1* | 7/2009 | Mathur | H04W 48/20 370/338 |
| 2009/0286525 A1* | 11/2009 | Kesavan et al. | 455/419 |
| 2010/0265823 A1* | 10/2010 | Zhao | H04W 28/12 370/233 |
| 2011/0051640 A1* | 3/2011 | Ramesh | H04W 48/14 370/311 |
| 2011/0128874 A1* | 6/2011 | Schmitt | 370/252 |
| 2011/0149912 A1* | 6/2011 | Jung | H04W 36/0061 370/331 |
| 2011/0158095 A1* | 6/2011 | Alexander | H04L 47/805 370/232 |
| 2011/0216692 A1* | 9/2011 | Lundsgaard et al. | 370/328 |
| 2011/0216717 A1* | 9/2011 | Zhu | H04W 28/24 370/329 |
| 2011/0255425 A1* | 10/2011 | Pikkarainen et al. | 370/252 |

(Continued)

*Primary Examiner* — Phirin Sam
*Assistant Examiner* — Mariela Vidal Carpio
(74) *Attorney, Agent, or Firm* — Great Lakes Intellectual Property, PLLC

(57) ABSTRACT

Wireless access network selection is contemplated. The selection process may include arbitrating use of a plurality of wireless networks according to their performance capabilities. The performance capabilities or parameters may be identified from information broadcasted from the wireless networks. Mobile devices capable of wirelessly connecting to the networks may identify the performance capabilities prior to connecting to the wireless networks, thereby enabling the mobile devices to more efficiently identify suitable networks.

20 Claims, 2 Drawing Sheets

(56) References Cited

U.S. PATENT DOCUMENTS

| | | | |
|---|---|---|---|
| 2011/0319071 A1* | 12/2011 | Beppler | H04W 48/18 455/424 |
| 2012/0002614 A1* | 1/2012 | Ekici | H04W 48/18 370/329 |
| 2012/0158977 A1* | 6/2012 | Zhou | H04L 12/14 709/228 |
| 2013/0039275 A1* | 2/2013 | Patil et al. | 370/328 |
| 2013/0137423 A1* | 5/2013 | Das et al. | 455/426.1 |
| 2013/0215761 A1* | 8/2013 | Xu | H04W 24/08 370/241 |
| 2013/0288693 A1* | 10/2013 | Dai et al. | 455/450 |
| 2014/0226476 A1* | 8/2014 | Bertze | H04L 47/30 370/230.1 |
| 2014/0286295 A1* | 9/2014 | Liu | H04W 72/10 370/329 |
| 2014/0293783 A1* | 10/2014 | Kang | H04B 7/026 370/230 |
| 2014/0321432 A1* | 10/2014 | Li et al. | 370/331 |
| 2014/0341109 A1* | 11/2014 | Cartmell | H04L 45/308 370/328 |

* cited by examiner

DYNAMIC NETWORK SELECTION

TECHNICAL FIELD

The present invention relates to network selection, such as but not necessarily limited to network selection based on performance capabilities of available networks where the performance capabilities are analyzed prior to connecting to the corresponding network.

BACKGROUND

Wi-Fi hotspots and other types of wireless networks are becoming ubiquitous and an indispensable tool for facilitating Wi-Fi roaming and supplementing network data offloading. The mobile devices capable of supporting communication over such wireless networks are also being configured with more and more capabilities, including capabilities to facilitate communication over different types of wireless networks. The ability of such mobile devices to support communications with various types of wireless networks can be beneficial in expanding the likelihood that at least one wireless network within a vicinity of the mobile device can be used to facilitate wireless services. The decision of which one of the networks to connect to in order to facilitate the desired wireless services may be problematic in that the mobile device may be unable to assess the capabilities of potential wireless networks prior to actually connecting to the wireless network. Accordingly, the present invention contemplates a need to assess wireless network capabilities prior to connecting to the corresponding wireless network.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
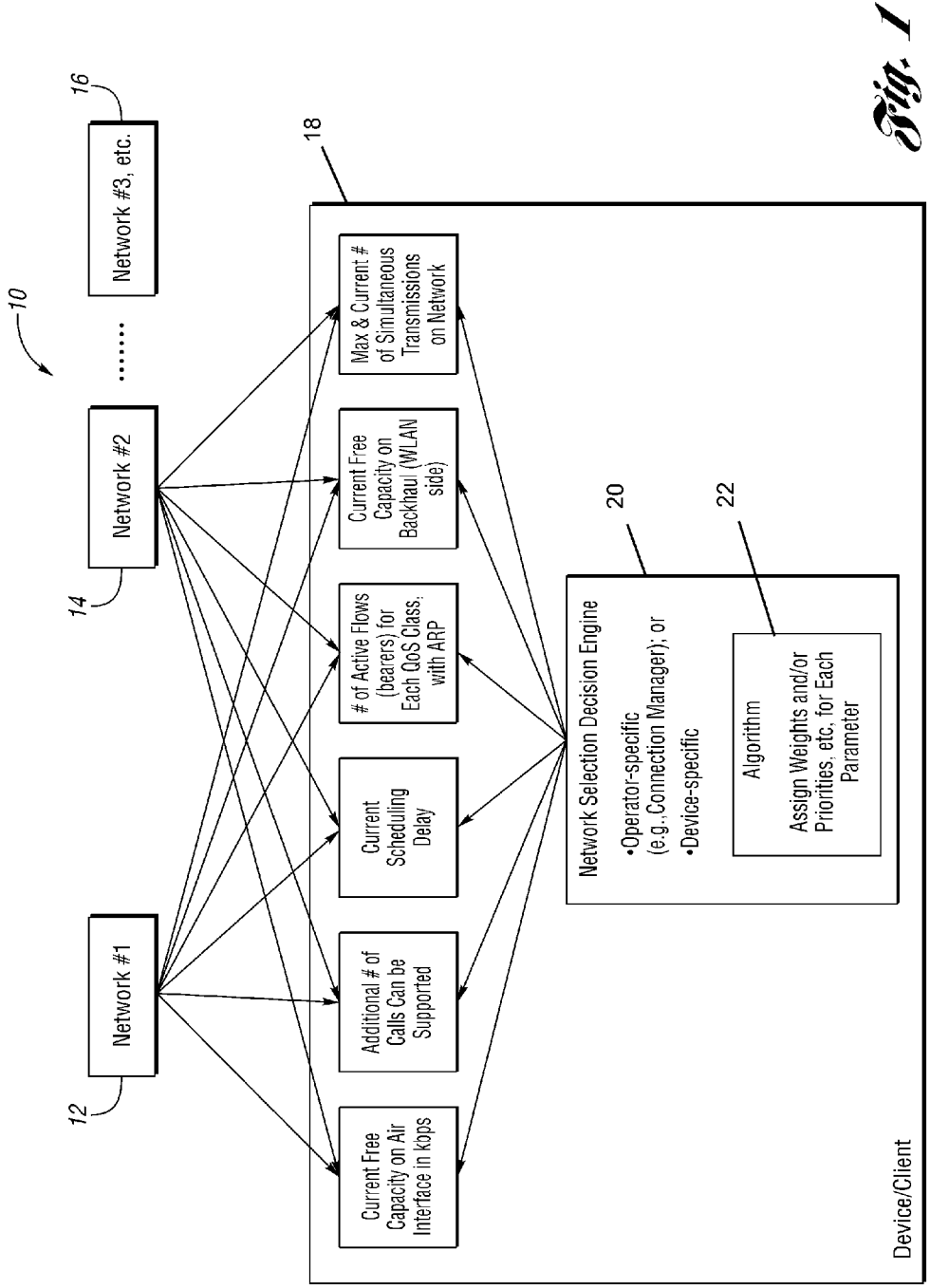
FIG. 1 illustrates a wireless networking system as contemplated by one non-limiting aspect of the present invention.

FIG. 1 illustrates a wireless networking system 10 as contemplated by one non-limiting aspect of the present invention. The wireless networking system 10 is shown to include a first network 12, a second network 14, a third network 16 and a device/client 18, which is referred to hereinafter as a mobile device 18. The wireless networking system 10 may be configured to facilitate any type of wireless signaling between the illustrated wireless networks 12, 14, 16, or additional wireless networks, and the mobile device 18 or additional mobile devices. The wireless networks 12, 14, 16 may be configured to support wireless signaling according to any one or more wireless signaling protocols and formats. The mobile device 18 may be configured to facilitate various services, including simultaneously supporting multiple services which require multiple wireless service flows. The mobile device 18 may include a network selection decision engine 20 configured to assess performance parameters broadcasted by the various networks 12, 14, 16 prior to deciding which one or more of the wireless networks 12, 14, 16 should be connected to in order to support the desired wireless service flows.

The present invention contemplates facilitating connection to any type of wireless network 12, 14, 16, including wireless networks 12, 14, 16 configured to facilitate wireless signaling associated with Wi-Fi per IEEE 802.11-2012, "Wireless LAN Medium Access Control (MAC) and Physical Layer (PHY) Specifications", Long Term Evolution (LTE) per 3GPP TS 36 series (Release 8), LTE-Advanced per 3GPP TS 36 series (Release 10), WiMAX per IEEE 802.16-2009, "Air Interface for Broadband Wireless Access Systems", HSPA+per 3GPP TS 25 series (Release 7), etc., the discloses of which are hereby incorporated by reference in their entirety. The wireless networks 12, 14, 16 may each include one or more antennas (not shown) and one or more access points (not shown) to facilitate the desired wireless signaling. The antennas may be configured in cooperation with computing devices or other associated hardware implements to facilitate communication of one or more of a plurality of wireless networking protocols, i.e., an access point associated with each network may be configured to simultaneously support wireless signaling according to different wireless signaling protocols or formats. The wireless networks 12, 14, 16 also need not be configured to provide the same types of wireless signaling, e.g., the first wireless network 12 may be configured as a cellular-type of wireless network while the second 14 and third wireless networks 16 may be configured as Wi-Fi networks or other non-cellular types of networks.

The mobile device 18 may be any type of implement having capabilities sufficient to facilitate wireless communication, including but not limited to a cellular phone, a computer, a tablet, a voice over Internet protocol (VoIP) device, a media terminal adapter (MTA), a personal digital assistant (PDA), etc. The mobile device 18 may be configured to support virtually any type of service, such as services including but not limited to phone communications, video communications, web browsing, VoIP calls, etc. The mobile device 18 may include a display, speakers, microphone and other devices to facilitate interfacing services with a user. The mobile device 18 may be configured to simultaneously support multiple services, including the mobile device 18 being configured to simultaneously support a phone conversation while web browsing and viewing a video stream. In the event one or more of the desired services require wireless signaling, the mobile device 18 may be configured to support a suitable number of wireless service flows. The wireless service flows may correspond with wireless signaling exchange between the mobile device 18 and one or more of the available networks 12, 14, 16.

The network selection decision engine 20 may be configured in accordance with the present invention to facilitate assigning each required wireless service flow to one or more of the available wireless networks 12, 14, 16. The mobile device 18 may include a computing device (not shown) associated with a computer-readable medium (not shown) having instructions sufficient to facilitate directing operation of the mobile device 18 to facilitate network selection in the manner contemplated by the present invention. The mobile device 18 may include one or more antennas to facilitate the wireless signaling necessary to simultaneously support the desired service flows. The antenna may be configured to receive information broadcasted from the wireless networks 12, 14, 16 for use by the decision engine 20 in assessing whether to connect to one or more of the wireless networks 12, 14, 16. The antenna or other feature of the mobile device 18 may be sufficiently configured to simultaneously connect to one or more of the available networks 12, 14, 16 while also receiving information from non-connected wireless networks 12, 14, 16, e.g., the mobile device 18 may be connected to the first and second wireless networks 12, 14 while also receiving information from the third wireless network 16.

The invention contemplates the wireless networks 12, 14, 16, or access points associated with wireless networks 12, 14, 16, broadcasting synchronization messages. The synchronization messages may include information related to the corresponding wireless network, such as connection parameters and performance parameters. The synchronization messages may be rather small in size, e.g., less than 1000 bits, or preferably less than 14 bits for the connection parameters or MIB and less than 210 bits for the synchronization parameters, in order to limit the processing of the mobile devices 18. The small size of the synchronization messages may be particularly beneficial in limiting the processing demands on the mobile devices 18 when located within an area subjected to a great number of wireless networks 12, 14, 16, i.e., by limiting the size of the synchronization messages, the mobile device 18 may not have a limitation on the number of synchronization messages which it can receive at the same time. The synchronization messages may correspond with messages transmitted from nearby wireless networks 12, 14, 16 while the mobile device 18 is connected to the wireless network 12, 14, 16 or other wireless networks 12, 14, 16. It may include information sufficient to perform measurements associated with facilitating or otherwise triggering handover requests or changes from one network to another network.

The connection parameters included within the synchronization messages may include information such as system bandwidth and system frame number, detailing aspects of the wireless network which are associated with facilitating its connection to the mobile device. These types of connection parameters may include information associated with a master information block (MIB), a Wi-Fi beacon, system information blocks (SIBs). A mobile device 18 may be considered to be synchronized to a wireless network 12, 14, 16 when it listens for and decodes broadcast synchronization and system messages such as beacons, MIB, SIBs, from the network. The mobile device 18, however, may not be considered to be connected to the network until it has received all information necessary to start the process of connecting to the wireless network. In an LTE system, the mobile device 18 may look for broadcast messages to determine system framing boundaries, then decode MIB message for system bandwidth and system frame number. The mobile device 18 may then continue to decode SIBs to obtain additional connection parameters. In a Wi-Fi system, the mobile device 18 may look for the beacon message to obtain system information. The broadcast messages (beacon, MIB, SIBs, etc) that the mobile device 18 decodes before sending any information to the network 12, 14, 16 to initiate the connection process may be termed a synchronization messages for the purpose of this application. Accordingly, the present invention contemplates the connection parameters included within the synchronization messages being distinguished from the performance parameters such that the information is classified according to whether it is used to facilitate connection to the network or to identify the performance of network.

The performance parameters included within the synchronization messages may include information detailing performance capabilities or other metrics indicative of the corresponding networks 12, 14, 16 ability to support service flows or particular types of service flows. The performance parameters may include but are not necessary limited to current free capacity on air interface, additional number of flows available for support, current scheduling delay, number of active flows for each QoS class, current free capacity on backhaul and max and current number of simultaneous transmissions on network. The performance parameters may characterize current or future capabilities of the network 12, 14, 16 to facilitate one or more of service flows desired by the mobile device. The mobile device 18 may include an algorithm 22 or other feature to facilitate analysis of the performance parameters received from various networks 12, 14, 16. This may include cross-referencing or temporarily storing the performance parameters with identification of the corresponding network 12, 14, 16. The algorithm 22 may assign weights and/or other priorities to each performance parameter specified within the synchronization message for use in assessing the suitability of the corresponding network 12, 14, 16 to support one or more of the service flows.

The synchronization message may be received and processed by the mobile device 18 before the mobile device 18 actually connects to the corresponding network 12, 14, 16. The synchronization message may include information necessary to facilitate such a connection as well as information necessary to facilitate assessing abilities of the network prior to connecting to it. The ability of the mobile device 18 to assess the capabilities of each of the plurality of wireless networks 12, 14, 16 prior to actually connecting to the wireless networks 12, 14, 16 may be beneficial in allowing the mobile device 18 to selectively choose an appropriate one or more of the wireless networks 12, 14, 16 to support one or more of the desired service flows in advance of actually connecting to the corresponding network 12, 14, 16. This may save the mobile device 18 time lost having to switch from an incapable network 12, 14, 16 to a more capable network 12, 14, 16 or to suffer the consequences of supporting service flows over a network 12, 14, 16 having capabilities that cause the service delivery to be poor or below a desired quality of service or to be disconnected altogether. While various performance parameters may be reviewed to assess appropriate wireless network 12, 14, 16, the present invention also contemplates facilitating the assessment on a service flow by service flow basis such that each available network 12, 14, 16 is assessed relative to its capabilities to support each of the service flows.

The ability to assess network suitability on a service flow by service flow basis may be beneficial in allowing the mobile device 18 to arbitrate between available wireless networks 12, 14, 16 according to the demands of the particular service flows. This may be useful, for example, in allowing the mobile device 18 to simultaneously support a web browsing service flow, a video streaming service flow, and a cellular phone call service flow over multiple networks 12, 14, 16. The mobile device 18 may be configured to select the more robust or better performing network to support the more data intensive service flows, e.g., a service flows associated with video streaming, and to select the less robust network to support the lowest data intensive service flows, e.g., web browsing. While the present invention is predominately described with respect to arbitrating the desired service flows to the available wireless networks 12, 14, 16 according to performance parameters, the present invention fully contemplates arbitrating according to other factors, such as cost and subscription rates or priorities. The cost to support signaling over network 12, 14, 16 may be a factor in deciding between two equal networks such that a less costly network may be selected or when deciding between two networks where one network has better performance than a lower performing network such that the lower performing network may be selected if the cost to use the higher performing network is excessive.

Figure 2:
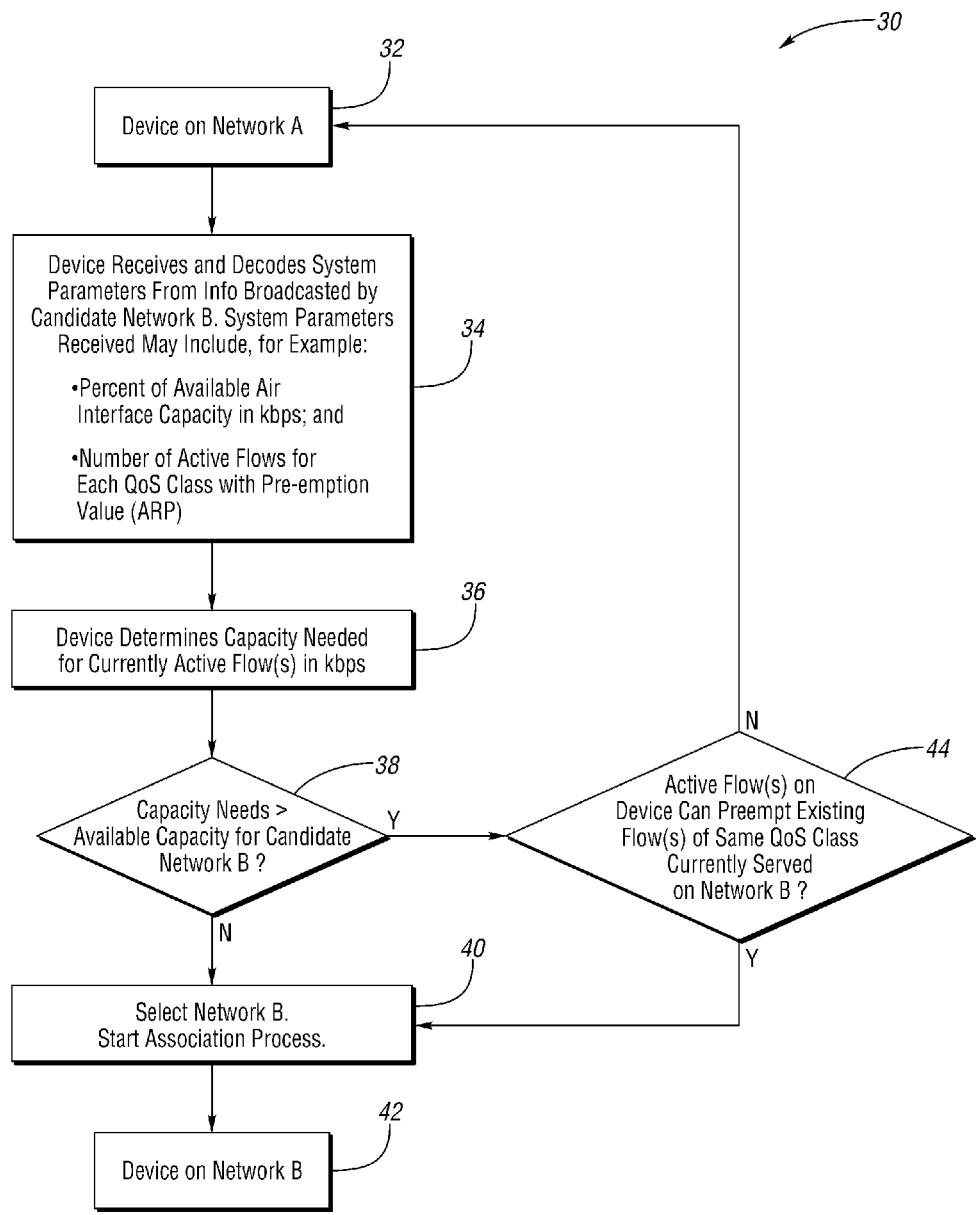
FIG. 2 illustrates a flowchart of a method of facilitating network selection in accordance with one non-limiting aspect of the present invention.

FIG. 2 illustrates a flowchart 30 of a method of facilitating network selection in accordance with one non-limiting aspect of the present invention. The method relates to allocating service flows associated with the mobile device 18 to one or more nearby networks 12, 14, 16 or networks otherwise available to facilitate wireless signaling required to support the service flows. The method may be embodied in a computer-readable medium associated with one or more of the devices illustrated in FIG. 1 or otherwise associated with the system 10 or otherwise having capabilities sufficient to facilitate the operations contemplated by the present invention. The method may be used to facilitate analysis of network performance parameters prior to joining a network 12, 14, 16 such that service flows may be assigned for support over the same or different networks depending on the network's capability to meet the performance requirements of the corresponding service flow. The method presumes the mobile device 18 is capable of simultaneously supporting multiple service flows with one or more networks 12, 14, 16, however, the present invention is not necessarily so limited and fully contemplates its use and application with mobile devices having other communication requirements or limitations.

Block 32 relates to the mobile device being connected to the first wireless network 12. This may occur after the mobile device 18 has received a synchronization message from the first wireless network 12. The mobile device 18 may have already decoded the synchronization message to recover connection information sufficient to facilitate its connection to the first wireless network 12. At this point in time, the mobile device 18 may be supporting one or all of its service flows over the first wireless network 12. The mobile device 18 may be connected to additional wireless networks 14, 16 in addition to the first wireless network 12 and/or the mobile device 18 may be receiving a request from a user to support additional service flows or to remove current service flows. The mobile device 18 may have selected connection to the first wireless network 12 according to performance parameters included within the decoded synchronization message. The mobile device 18 may be configured to compare the performance parameters specified within the synchronization message to actual performance measurements taken while connected to the first wireless network 12 in order to assess its current performance and/or whether its current performance is sufficient to meet the requirements of each supported service flow.

Block 34 relates to the mobile device 18 receiving performance parameters and/or connection parameters within synchronization messages issued from a second wireless network 14. The performance parameters may be analyzed to determine the capabilities of the second wireless network 14 to support one or more of the service flows actively occurring on the mobile device 18 or likely to occur in the future, e.g., the mobile device 18 may have received a request to create a new service flow. The mobile device 18 may be configured to search for nearby networks 12, 14, 16 or to process performance parameters broadcasted from nearby networks 12, 14, 16 upon determining a need to create a new service flow or to change an existing service flow to another network 12, 14, 16, such as if current network's performance begins to degrade. In the absence of such a need, the mobile device 18 may optionally be configured to ignore or to otherwise disregard processing of the broadcasted synchronization messages and/or performance parameters in order to limit its processing to situations in which a creation or a change in service flow is desired or likely. The present invention, however, is not necessarily so limited and fully contemplates the mobile device continuously processing any signalization messages or performance parameters received from nearby wireless networks, particularly if the corresponding messages are below a message threshold, e.g., 100 bits.

Block 36 relates to the mobile device determining a capacity need for the currently active service flows in kilobits per second (kbps) or unit of choice. The capacity needs may be based on actual measurements taken while facilitating the current service flow and/or based on historical values recorded for similar types of service flows. Optionally, the mobile device 18 may be pre-configured with service flow capacity needs for particular types of services such that the required service flows are automatically determined as a function of the requested service flow. The capacity needs may be specified according to a threshold such that any network 12, 14, 16 exceeding the threshold may be considered to be a candidate to support the corresponding service flow while networks 12, 14, 16 below the threshold may not be considered to be a candidate to support the corresponding service flow. The service flow/connection needs of the mobile device 18 and/or the service flows may be based on other parameters other than capacity needs in kilobits per second, such as QoS requirements, jitter requirements, attenuation requirements, latency requirements, protocol requirements, formatting requirements, costs or other parameters. The capacity needs may be assessed an ongoing basis in order to facilitate network reallocation whenever capacity needs are not met and/or in advance of capacity needs failing, e.g., in the event the mobile device 18 is moving farther away from an access point of the first network 12, it can be presumed that the capacity needs will not be met at a certain point in the future.

Block 38 relates to assessing capacity capabilities of any nearby networks 12, 14, 16 or networks likely to be nearby when the capacity needs are not met. The capacity capabilities of the nearby networks 12, 14, 16, which for exemplary purposes as described with respect to only the second wireless network 14, may be assessed based on performance parameters broadcasted from the corresponding network 14 or its access points. The capacity capabilities of networks 12, 14, 16 beyond the current communication range of the mobile device 18 may be based on previous capabilities measured or detective for the corresponding network 12, 14, 16 or based on pre-configured performance parameters made known to the mobile device 18, such as those specified within a capabilities map or other file downloaded to the mobile device 18 that details performance capabilities for networks 12, 14, 16 within a particular geographical location or area associated with the mobile device 18. This may be useful in allowing the mobile device 18 to assess performance prior to being within wireless range of the corresponding network. Optionally, a download or other transmission of the performance parameters may occur in bulk to the mobile device 18 in order to ameliorate the need of the mobile device 18 to listen to nearby networks 12, 14, 16 for the same type of performance parameters, e.g., a GPS unit included within the mobile device 18 may be used to communicate current location of the mobile device 18 so that an independent entity may be configured to transmit the mobile device 18 corresponding performance parameters for any number of nearby wireless networks 12, 14, 16.

Block 40 relates to the mobile device connecting to the second wireless network 14 in the event the current capacity needs of the mobile device 18 for one or more of the service flows exceeds the capabilities of the first wireless network 12 while the second network 14 has capacity to support those needs. The connection of the mobile device 18 to the second wireless network 14 may be based on the connection information included within the synchronization message or otherwise transmitted to the mobile device 18 in advance of connecting to the second wireless network 14. In this manner, the present invention contemplates the mobile device 18 assessing the capabilities of the second wireless network 14 to support one or more service flows prior to actually connecting to the second wireless network 14. Once connected, the mobile device 18 may begin transmitting new service flows over the wireless network 14 and/or transitioning existing service flows to the second wireless network. The mobile device 18 may be configured to specifically identify one or more of the service flows to be migrated to the second wireless network 14, including the mobile device 18 being configured to facilitate simultaneously supporting at least one service flow over both of the first and second wireless networks 12, 14. Block 42 relates to the mobile device 18 completing a handshake operation and beginning to transmit data over the second network for the corresponding service flow.

Block 44 relates to the mobile device 18 or the second wireless network 14 assessing active service flows over the wireless network 14 as part of a preemption process. The preemption process may be associated with the second network 14 not having capacity or not having sufficient capacity to support the desired one or more of the service flows of the mobile device 18 and a corresponding analysis of whether one or more of the service flows actively supported on the second network 14 can be preempted in favor of supporting the service flow of the mobile device 18. The preemption process may correspond with the second network 14 reassigning one of its currently active service flows to another network or otherwise deconstructing the corresponding service flow in order to support a new service flow with the mobile device 18. The preemption process may include assessing a subscription priority of the mobile device 18 relative to mobile devices associated with service flows of the second wireless network so that the service flow of the mobile device may preempt or takeover a service flow associated with a lower priority mobile device. This may include assessing QoS class assigned to service flows of the second wireless network.

The preemption process may be based on a preemption message issued from the mobile device 18. This may occur, for example, with the mobile device 18 transmitting a message to the access point or other processing entity associated with the second wireless network 14 after assessing its performance parameters and determining that it has or is supporting service flows having lower priorities than that associated with one or more of the mobile device's service flows. The preemption message may be used to notify the second wireless network 14 to deconstruct the lower priority service flow in favor of supporting one or more service flows of the mobile device. Instead of instructing the second wireless network 14 to take such an action, the preemption message may be used to request preemption or to inquire if preemption is possible. This type of message may be beneficial in allowing the second wireless network 14 to assess its current operating capabilities and whether its current customers or their service flows can be deconstructed in favor of the mobile device 18 instead of requiring the mobile device 18 to analyze all the service flows or other operating conditions of the second wireless network in determining whether a preemption is possible.

As supported above, the present invention relates a system and method for Enhanced Node B's (eNBs) or WiFi Access Points to communicate in real-time to the mobile device, a set of dynamically-changing network congestion and resource information, via broadcast methods, such as WiFi Beacons, or the LTE/LTE-Advanced Broadcast Control Channel (BCCH), in order to assist the mobile device in selecting a wireless access network to attach to. As Wi-Fi roaming and Wi-Fi data floating can occur when handsets mobile devices have multiple radios that can be turned on simultaneously and that can access multiple radio access technologies (RATs) at the same time.

One-limiting aspect of the present invention contemplates transmission of information, and specifies a set of information, in order to facilitate the process of network discovery and selection, when multiple RATs are available in a coverage area. This is may be used as a procedure that occurs when a handset is in range of multiple wireless networks, e.g., an LTE/LTE-Advanced network and a WiFi network. The handset's multiple radios may be turned on so that the handset can decide which wireless network to connect to, or connect which particular IP flow to which wireless network (i.e., the handset will remain on both networks). To make a better decision of whether to handoff to a different network, dynamic network information on current bandwidth availability and congestion level may be presented in accordance with the present invention to the handset before the handset makes a network selection. The handset can then use this information to perform network selection based on any standard or proprietary methods.

One non-limiting aspect of the present invention proposes that each eNB or WiFi APs communicates real-time access network information, as well as priority access support to the handset for network selection. This may be sufficient to enable the handset to utilize the information to determine whether it should select the network or not. The following is an example list of dynamic access network information that UE may be able to utilize to make a decision on network selection. All indicators describe current condition on AP or eNB: Amount of free capacity in kbps; Indicator for additional # of calls can be supported; Current scheduling delay; # of bearers (flows) currently connected for each QCI1 class, with ARP2; Max and current # of simultaneous sessions supported on cellular network; Current backhaul free capacity; and Support backward compatible Wi-Fi network A QoS Class Identifier may be used. Each QCI may be characterized by priority, packet delay budget and acceptable packet loss rate. The QCI label for a bearer may be used to determine how it is handled in the eNB. LTE only defines 9 QCIs, so can be easily included in a space-limited broadcast channel. A Allocation and Retention Priority may be used. The purpose for ARP may need to perform admission control. In LTE, if a higher ARP bearer wants to connect, a bearer with lower ARP may be be disconnected in order to support the new flow.

Mobile and Wi-Fi networks may be configured in accordance with the present invention to offer priority connectivity and assured bandwidth based on subscription. The priority completed by the present invention may include a preferred subscriber receiving service over other subscribers during periods of high traffic volume. A subscriber who has paid a premium subscription may be treated to the higher traffic priority than other non-premium subscribers. But subscription based priority is optional on many wireless networks, including Wi-Fi. With multi-radio (4G, 3G WLAN) user devices becoming more prevalent, the present invention contemplates the Wi-Fi network advertising support for subscription based priority service as part of 802.11 beacon frames. This may be useful in allowing multi-radio devices to make a more informed decision on network selection when multiple radio networks are available. The present invention also proposes that the information may be communicated in the broadcast Beacon frame by 802.11 APs, or in the Broadcast Control Channel (BCCH) by LTE eNBs. For LTE systems, the present invention may be used to facilitate transmission of dynamic network information on Master Information Block (MIB) and if necessary, System Information Block (SIBs).

A mobile device that is attached to a particular eNB may remain synchronized to multiple neighboring cells that are currently not serving the device, for purposes such as to perform measurements that may trigger a handover request. In order to save resources, the mobile may not read additional broadcast/unicast information by the non-serving cells beyond this point. However, acquiring the sync signals allows the mobile to be able to easily decode MIB and SIBs, which may include performance parameters and other information contemplated by the present invention to facilitate network selection. The MIB may be repeated frequently and configured to carry small amount of information such as cell bandwidth and is heavily coded. Encoding dynamic network information in the MIB may be used to allow the mobile device to acquire that information quickly and easily, without incurring un-necessary resources to decode additional transmissions from the non-serving cells. Additional dynamic network information can be carried on various SIBs.

A mobile device that is currently on a WiFi network may need to synchronize with an eNB, then decode the MIB and SIBs. For 802.11 APs, the present invention proposes the transmission of dynamic network information in 802.11 Beacon Frames. Network information can be inserted as a Vendor-specific element of Beacon Frame. This may be done with protocols defined to communicate information used for network selection: 3GPP ANDSF; 802.11u (ANQP); and 802.21 (MIHF peers communicate a set of information elements). The present invention contemplates use of these protocols to communicate static, or semi-static information such as: Operator ID; Geo-location of WiFi APs; Policies as to when handset should be searching for APs; Security protocols; Cost; and Backhaul link speed and load including ANQP allowing the UE to probe the AP with a request frame and a list of capability requests. However, the additional round trip time spent in probing increases the delay for handoff. Additionally, the probe still may not communicate any granular real-time resource information. The present invention proposes that the mobile devices take into account the dynamic network information into account while performing network selection. Doing so will help the multi-radio operators to best optimize their network utilization, and to serve each user's QoS needs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A non-transitory computer-readable medium having a plurality of non-transitory instructions executable with a processor of a mobile device to:
   support a service flow for a service operating on the mobile device;
   determine performance requirements for the service flow;
   determine a priority for the service flow;
   determine performance capabilities for multiple wireless networks;
   determine each one or more of the multiple wireless networks having performance capabilities equal to or greater than the performance requirements to be a qualified wireless network for the service flow;
   facilitate use of a first wireless network of the qualified networks to support the service flow;
   change support of the service flow from the first wireless network to a second wireless network of the qualified networks after determining the performance capabilities of the first wireless network no longer meets the performance requirements of the service;
   determine from system performance parameters associated with the second wireless network one or more existing service flows currently active thereon;
   determine from the system performance parameters a priority for each of the existing service flows;
   preempt one of the existing service flows of the second wireless network with the service flow through issuance of a preemption message to the second network, the preemption message being communicated from the mobile device to the second wireless network;
   select the one of the existing service flows to preempt to be one of the existing services flows having the priority lower than the priority of the service flow;
   identify within the preemption message the priority associated with the service; and
   identify within the preemption message the one of the existing service flows to be preempted.

2. The computer-readable medium of claim 1 further comprising non-transitory instructions to determine the system performance parameters from information wirelessly broadcasted from the second wireless network.

3. The computer-readable medium of claim 2 further comprising non-transitory instructions to determine the information from a master information block (MIB) broadcasted from the second wireless network.

4. The computer-readable medium of claim 2 further comprising non-transitory instructions to determine the information from system information blocks (SIBs) broadcasted from the second wireless network.

5. The computer-readable medium of claim 1 further comprising non-transitory instructions sufficient to determine the system performance parameters from information communicated from the first wireless network and without the mobile device connecting to the second wireless network.

6. The computer-readable medium of claim 1 further comprising non-transitory instructions to determine the first wireless network no longer meets the performance requirements of the service when at least one of the following the performance capabilities of the first wireless network are below a threshold: current free capacity for an air interface, additional number of flows available, current scheduling delay, number of active flows for each QoS class, current free capacity on backhaul, current number of simultaneous transmissions, available bandwidth to individual content provider or content, and list of available private networks.

7. The computer-readable medium of claim 1 further non-transitory instructions to:
   determine the priority for the service as having a premium designation, the premium designation indicating a user associated therewith having paid a premium for access to the multiple wireless networks;
   determine the priority for one or more of the existing service flows as having the premium designation, thereby indicating additional users associated therewith having also paid the premium for access to the multiple wireless networks; and
   determine the priority for one or more of the existing service flows as having a non-premium designation, the non-premium designation indicating additional users associated therewith having not paid the premium for access to the multiple wireless networks; and
   select the one of the existing service flows to be preempted to be one of the one or more of the existing service flows having the non-premium designation.

8. The computer-readable medium of claim 1 further comprising non-transitory instructions to:
   determine the performance capabilities for the multiple wireless networks from a capabilities map downloaded to the mobile device prior to being within a wireless range of the second wireless network, the capabilities map indicating the performance capabilities anticipated or likely for the second wireless network; and
   determine the system performance parameters for the second wireless network from a message wirelessly transmitted to the mobile device from the second wireless network after the mobile device reaches the wireless signaling range of the second wireless network.

9. A wireless networking system comprising:
   multiple wireless networks; and
   a mobile device, the mobile device including non-transitory computer-readable medium having a plurality of non-transitory instructions executable with a processor to:
   i) support a service flow for a service operating on the mobile device;
   ii) determine performance requirements for the service flow;
   iii) determine a priority for the service flow;
   iv) determine performance capabilities for the multiple wireless networks;
   v) determine each one or more of the multiple wireless networks having performance capabilities equal to or greater than the performance requirements to be a qualified wireless network for the service flow;
   vi) facilitate use of a first wireless network of the qualified networks to support the service flow;
   vii) change support of the service flow from the first wireless network to a second wireless network of the qualified networks after determining the performance capabilities of the first wireless network no longer meets the performance requirements of the service;
   viii) determine from system performance parameters associated with the second wireless network one or more existing service flows currently active thereon;
   ix) determine from the system performance parameters a priority for each of the existing service flows;
   x) preempt one of the existing service flows of the second wireless network with the service flow through issuance of a preemption message to the second network, the preemption message being communicated from the mobile device to the second wireless network;
   xi) select the one of the existing service flows to preempt to be one of the existing services flows having the priority lower than the priority of the service flow;
   xii) identify within the preemption message the priority associated with the service; and
   xiii) identify within the preemption message the one of the existing service flows to be preempted.

10. The system of claim 9 wherein the non-transitory instructions determine the system performance parameters from information wirelessly broadcasted from the second wireless network within a master information block (MIB) or system information blocks (SIBs).

11. The system of claim 9 wherein the non-transitory instructions determine the system performance parameters from information communicated from the first wireless network and without the mobile device connecting to the second wireless network.

12. The system of claim 9 wherein the non-transitory instructions determine the first wireless network no longer meets the performance requirements of the service when at least one of the following the performance capabilities of the first wireless network are below a threshold: current free capacity for an air interface, additional number of flows available, current scheduling delay, number of active flows for each QoS class, current free capacity on backhaul, current number of simultaneous transmissions, available bandwidth to individual content provider or content, and list of available private networks.

13. The system of claim 9 wherein the non-transitory instructions:
   determine the priority for the service as having a premium designation, the premium designation indicating a user associated therewith having paid a premium for access to the multiple wireless networks;
   determine the priority for one or more of the existing service flows as having the premium designation, thereby indicating additional users associated therewith having also paid the premium for access to the multiple wireless networks; and
   determine the priority for one or more of the existing service flows as having a non-premium designation, the non-premium designation indicating additional users associated therewith having not paid the premium for access to the multiple wireless networks; and
   select the one of the existing service flows to be preempted to be one of the one or more of the existing service flows having the non-premium designation.

14. The system of claim 9 wherein the non-transitory instructions:
   determine the performance capabilities for the multiple wireless networks from a capabilities map downloaded to the mobile device prior to being within a wireless range of the second wireless network, the capabilities map indicating the performance capabilities anticipated or likely for the second wireless network; and
   determine the system performance parameters for the second wireless network from a message wirelessly transmitted to the mobile device from the second wireless network after the mobile device reaches the wireless signaling range of the second wireless network.

15. A method for facilitating wireless networking of a service flow operating on a mobile device comprising:
- determining performance requirements for the service flow;
- determining a priority for the service flow;
- determining performance capabilities for the multiple wireless networks;
- determining each one or more of the multiple wireless networks having performance capabilities equal to or greater than the performance requirements to be a qualified wireless network for the service flow;
- facilitating use of a first wireless network of the qualified networks to support the service flow;
- changing support of the service flow from the first wireless network to a second wireless network of the qualified networks after determining the performance capabilities of the first wireless network no longer meets the performance requirements of the service;
- determining from system performance parameters associated with the second wireless network one or more existing service flows currently active thereon;
- determining from the system performance parameters a priority for each of the existing service flows;
- preempting one of the existing service flows of the second wireless network with the service flow through issuance of a preemption message to the second network, the preemption message being communicated from the mobile device to the second wireless network;
- selecting the one of the existing service flows to preempt to be one of the existing services flows having the priority lower than the priority of the service flow;
- identifying within the preemption message the priority associated with the service; and
- identifying within the preemption message the one of the existing service flows to be preempted.

16. The method of claim 15 further comprising determining the system performance parameters from information wirelessly broadcasted from the second wireless network within a master information block (MIB) or system information blocks (SIBs).

17. The method of claim 15 further comprising determining the system performance parameters from information communicated from the first wireless network and without the mobile device connecting to the second wireless network.

18. The method of claim 15 further comprising determining the first wireless network no longer meets the performance requirements of the service when at least one of the following the performance capabilities of the first wireless network are below a threshold: current free capacity for an air interface, additional number of flows available, current scheduling delay, number of active flows for each QoS class, current free capacity on backhaul, current number of simultaneous transmissions, available bandwidth to individual content provider or content, and list of available private networks.

19. The method of claim 15 further comprising:
- determining the priority for the service as having a premium designation, the premium designation indicating a user associated therewith having paid a premium for access to the multiple wireless networks;
- determining the priority for one or more of the existing service flows as having the premium designation, thereby indicating additional users associated therewith having also paid the premium for access to the multiple wireless networks; and
- determining the priority for one or more of the existing service flows as having a non-premium designation, the non-premium designation indicating additional users associated therewith having not paid the premium for access to the multiple wireless networks; and
- selecting the one of the existing service flows to be preempted to be one of the one or more of the existing service flows having the non-premium designation.

20. The method of claim 15 further comprising determining:
- the performance capabilities for the multiple wireless networks from a capabilities map downloaded to the mobile device prior to being within a wireless range of the second wireless network, the capabilities map indicating the performance capabilities anticipated or likely for the second wireless network; and
- the system performance parameters for the second wireless network from a message wirelessly transmitted to the mobile device from the second wireless network after the mobile device reaches the wireless signaling range of the second wireless network.

* * * * *